United States Patent
Kim et al.

(10) Patent No.: US 7,118,724 B2
(45) Date of Patent: *Oct. 10, 2006

(54) METHOD OF PRODUCING NANOPHASE WC POWDER BY VAPOR PHASE REACTION

(75) Inventors: Byung Kee Kim, Busan-shi (KR); Jin Chun Kim, Gyoungsangnam-do (KR); Gook Hyun Ha, Busan-shi (KR); Chul Jin Choi, Gyoungsangnam-do (KR)

(73) Assignee: Korea Institute of Machinery and Materials, Daejon (KR)

( * ) Notice: Subject to any disclaimer, the term of this patent is extended or adjusted under 35 U.S.C. 154(b) by 219 days.

This patent is subject to a terminal disclaimer.

(21) Appl. No.: 10/747,656

(22) Filed: Dec. 30, 2003

(65) Prior Publication Data

US 2004/0219091 A1   Nov. 4, 2004

(30) Foreign Application Priority Data

Dec. 30, 2002   (KR) .................... 10-2002-0086721

(51) Int. Cl.
*C01B 31/34* (2006.01)
*C01G 41/00* (2006.01)

(52) U.S. Cl. .................... 423/440; 423/59; 977/775; 977/776

(58) Field of Classification Search ............... 423/440, 423/59; 977/775, 776
See application file for complete search history.

*Primary Examiner*—Wayne Langel
*Assistant Examiner*—Alvin T Raetzsch
(74) *Attorney, Agent, or Firm*—Lowe, Hauptman & Berner

(57) ABSTRACT

Nanophase WC powder is produced by preparing a precursor including tungsten; producing gas by vaporizing or sublimating the precursor; carbonizing the gas in the atmosphere without oxygen while maintaining pressure below atmospheric pressure; and condensing the carbonized gas

10 Claims, 3 Drawing Sheets

METHOD OF PRODUCING NANOPHASE WC POWDER BY VAPOR PHASE REACTION

RELATED APPLICATIONS

The present application is based on, and claims priority to Korean Application Serial Number 10-2002-0086721, filed Dec. 30, 2002, the disclosure of which is hereby incorporated by reference herein in its entirety.

TECHNICAL FIELD

The present invention relates to a method of producing nanophase powder, which is used as cemented carbide requiring high strength and wear-resistance, or materials for high-speed tool steel, heat-resistance steel etc., or more particularly, to a method of producing WC powder of grade of several ten nanometers from a precursor containing tungsten by means of vapor phase reaction.

BACKGROUND OF THE INVENTION

Generally WC powder is produced in most cases by solid state reaction in which W powder and solid state carbon powder are mixed and carbonized at high temperature. However, the prior art method users a start material in solid state and so requires mixing and milling process. Also the process is complicated due to many steps in the process of oxidized W, and time consuming due to the interaction between solid state materials in the growth of WC powder.

Meanwhile, liquid state methods have been used to produce fine powder of WC/Co by spray-drying solution including W and Co by using water-soluble metal base. However, these methods require many complicated process. Also further, with these types of methods, there are limitations in producing ultra-fine powder of 0.1 μm or less due to the growth of WC powder in the carbonizing heat treatment.

SUMMARY OF THE INVENTION

The present invention purports to provide a method of producing WC cemented carbide powder of approximately 10 nm or below by a simpler process by using vapor phase reaction.

In order to accomplish this objective, with respect to the method of producing WC powder from a precursor containing tungsten, the present invention comprises the steps of preparing a precursor containing tungsten; producing gas by vaporizing or sublimating said precursor; carbonizing said gas in the atmosphere without oxygen while maintaining pressure below atmospheric pressure; and condensing said carbonized gas.

DETAILED DESCRIPTION OF THE PREFERRED EMBODIMENT

The present invention is described in further detail as below. The present invention comprises producing nanophase powder by directly vaporizing or sublimating a precursor containing tungsten, and then by carbonizing and heat-treating said gas at the pressure below atmospheric pressure.

Any precursors as long as they contain tungsten suffice as said precursor, and liquid-phase precursors, such as tungsten ethoxide solution (V solution) or tungsten chloride ($WCl_6$) solution, or solid-phase precursors, such as tungsten hexacarbonyl ($W(CO)_6$), may be used. Or another element such as Co can be added to the solution if necessary.

The present invention comprises vaporizing or sublimating said precursor into gas, and then carbonizing said gas in the atmosphere without oxygen while maintaining pressure below atmospheric pressure.

Figure 1:
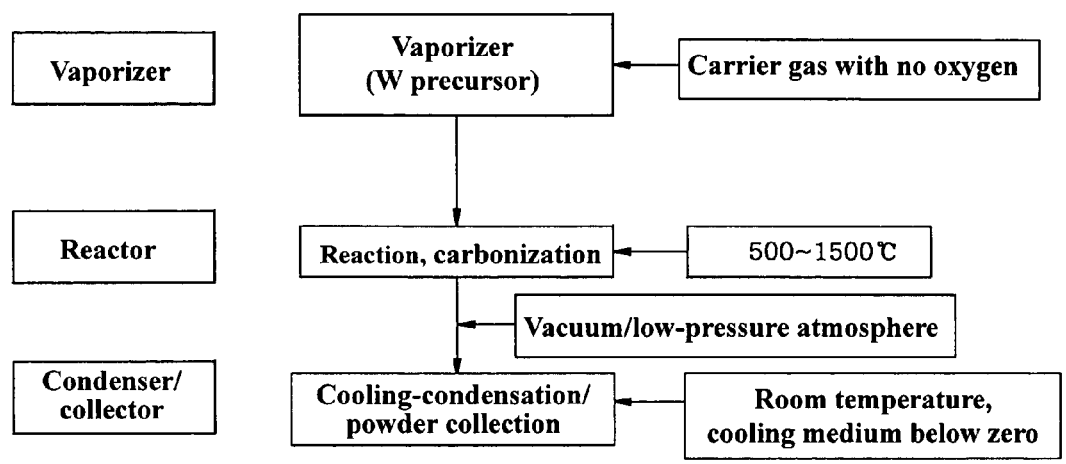
FIG. 1 is a flowchart for producing nanophase WC powder according to the present invention.
Figure 2:
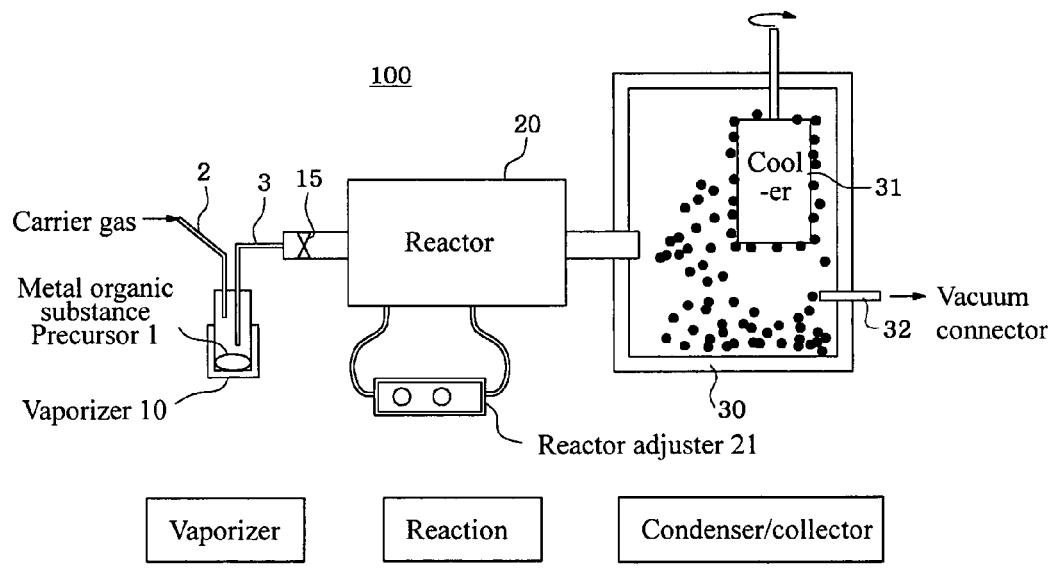
FIG. 2 is a structural diagram, which illustrates the apparatus for producing nonophase powder, which is used in the production method of the present invention.

FIG. 1 is a flowchart for producing nanophase WC powder according to the present invention, and FIG. 2 is a structural diagram, which exemplifies the apparatus for producing nanophase powder according to the present invention for vaporizing said precursor, followed by separation and condensation of the tungsten component.

As illustrated in FIG. 2, the apparatus 100 for producing nanophase powder by vapor phase reaction comprises a vaporizer 10, which vaporizes the precursor 1 fed from a storage vessel by means a pump (not illustrated); a reactor 20, which separates the tungsten component by heating said vaporized precursor; and a condenser 30 connected to said reactor 20.

The vaporizer 10 is connected with a carrier-gas feed pipe 2, and a mixed-gas feed pipe 3, which discharges the mixed gas of vaporized precursors and carrier gas. The vaporizer 10 feeds the mixed gas to the reactor 20.

The reactor 20 is connected with a reactor adjustor 21, which can adjust the temperature of the reactor. Further, a reactor valve 15 is installed between the vaporizer 10 and the reactor 20 for adjusting the flow rate of carrier gas.

Upon opening said reactor valve 15 for producing WC powder, the mixed gas of the vaporized precursor and carrier gas is fed to the reactor 20, and then the gas is carbonized at a pressure below atmospheric pressure. The carbonized gas is supplied to the condenser 30 for condensation and collection, and the remainder gas is discharged to the discharge pipe 32.

The main characteristics of the present invention are as follows: By means of carbonization of precursor gas, which is in gas phase at a molecular level, at a pressure below atmospheric pressure, the carbonization reaction rate is fast, and by the same token, the size of the end-product powder, condensed after the completion of the carbonization reaction, is approximately 10 nm or less in nanophase.

The pressure for carbonization reaction is set preferably at $1.3 \times 10^{-5}$~1 atm. According to the present invention, it is possible to obtain fine WC powder under carbonization reaction pressure of room pressure of 1 tm. However, it the reaction pressure is maintained at low pressure of less than 1 atm, the reaction rate could be further increased. Yet, to maintain ultra-low pressure of less than $1.3 \times 10^{-5}$ atm, it is problematic in terms of cost, and therefore it is necessary to maintain the above pressure range.

The feed pipes (2,3) can be made of metal, such as stainless steel or copper, or ceramics or Teflon, such as alumina, mullite or silicon carbide. It is preferable to use a material which can withstand a temperature of 50~300° C. in the range of vaporization temperature of the precursor 1. Further, the vaporizer 10 can be made of a stainless steel tube, alumina tube, quartz tube, or pyrex tube, with one end blocked off, which can withstand the vaporization temperature of the precursor.

Carrier gas can be selected, at least one, from CO, $CO_2$, $CH_4$, $C_2H_4$, He, Ar, $N_2$, or $H_2$, or the mixture thereof, which can form inert atmosphere, and the flow rate of gas of approximately 10~2,000 cc/min is appropriate.

Meanwhile, in case of using liquid-phase precursors, the flow rate of 0.05~2 cc/min is appropriate.

The reactor 20, in the shape of a horizontal tube, can be made of a stainless steel tube, quartz tube, mullite tube, alumina tube, etc. The reactor 20 is equipped with a heater. The reaction gas (carbonization gas) including C component is introduced into the reactor to react with the gasified precursor.

When CO, $CO_2$, $CH_4$, $C_2H_4$ is used as carrier gas introduction of carbonization gas is not necessary since the carrier gas transporting the precursor gas in the vaporizer 10 and pipe 3 can be used as a carbonization gas in the reactor 20. Since the temperature in the reactor 20 is maintained which is sufficient for carbonization reaction, the carrier gas can be used in the carbonization.

The atmosphere in the reactor 20 is maintained without oxygen by means of carrier gas. In the present invention, carbonization is carried out preferably at the temperature of 500–1,500° C., or more preferably at 1,000~1,200° C. If it is 500° C. or less, the carbonization reaction does not occur actively, and in the interest of product yield and cost reduction, the upper limit should be preferably kept at 1,500° C.

The gas carbonized in the reactor 20 are fed into the condenser 30, in which the gas sinks naturally and condenses, or absorbs to the surface of a cooler installed within the condenser and condenses thereafter. The cooler is filled with cooling medium of temperature below zero, such as cooling water, liquid nitrogen or liquid helium, and by using such cooler, by way of the so-called thermophoresis effect, the absorption is carried out much faster than that of condensation by natural sinking. If the cooler is rotated, it further results in superior condensation efficiency.

Other elements such as Co, Mo, V, Ni, Cr or Fe can be added to the precursor.

Below, the present invention is described in further detail through an example. The example is for illustration purposes only and is not intended to limit the present invention to any specific form. It may be readily known to those skilled in the art that the present invention is not restricted to the example. It is intended that the scope of the present invention be defined by the claims appended hereto and their equivalents.

EXAMPLE

Tungsten hexacarbonyl, which is a non-corrosive solid-phase precursor, with a vaporization temperature of 170° C., was prepared and fed through the apparatus of FIG. 2. In feed, it was vaporized and then fed into the reactor of an alumina tube of an outer diameter of approximately 40 mm and an inner diameter of approximately 30 mm. CO gas was used as carrier gas.

The vaporized precursor is carbonized and condensed in the reactor under various temperature and pressure. Table 1 shows the result.

TABLE 1

| | Carbonization Temperature (° C.) | Size of powder particle | Pressure (atm) |
|---|---|---|---|
| Example | 600 | 4 | $1.3 \times 10^{-2}$ |
| | 1000 | 5 | |
| Comparative Example | 600 | 53 | 1 |

As can be seen in table 1, the powder of example, which is carbonized at low pressure, shows fine structure compared with the powder of comparative example, which is carbonized at atmospheric pressure.

Figure 3A:
FIG. 3 is a photograph, which shows the structure of nanophase powder produced according to the present invention.
Figure 3B:
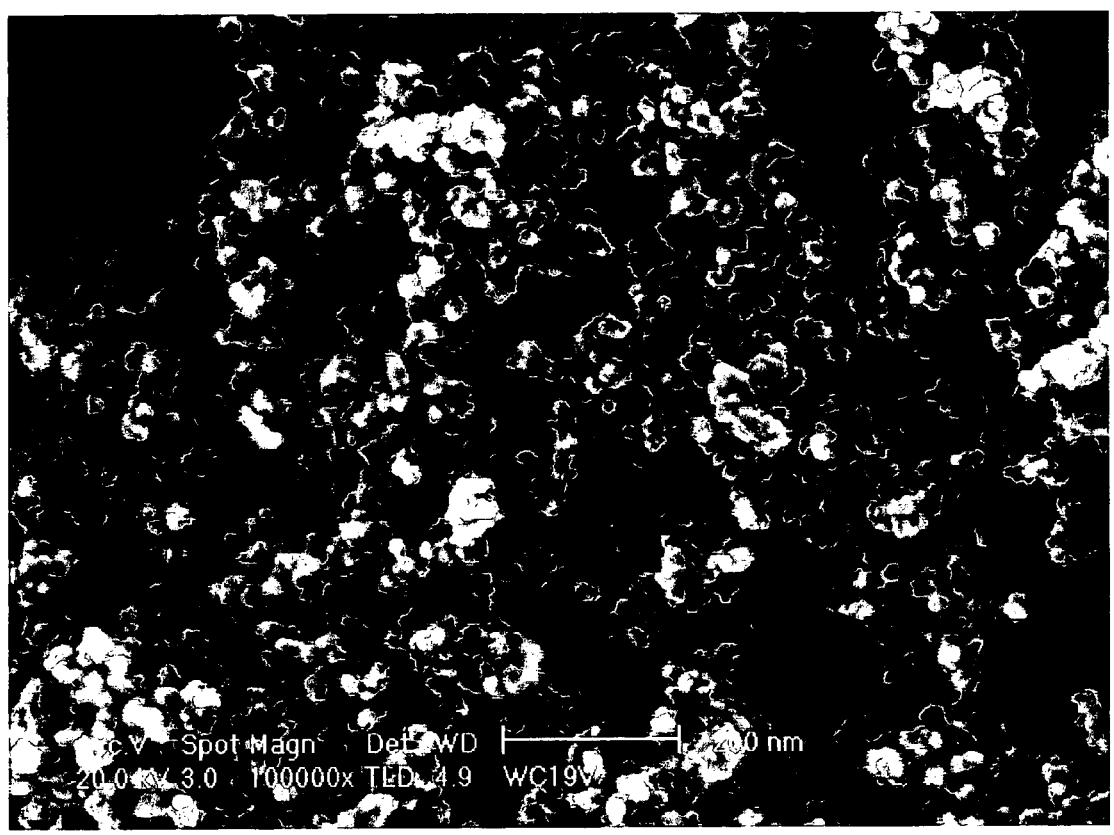

FIG. 3 shows the picture of WC powder collected after carbonization. As can be seen in the picture, the size of WC powder produced by the method of the present invention is about 4 nm smaller than 10 nm.

INDUSTRIAL APPLICABILITY

As described in the specification, the present invention provides advantages in that the present invention is a simple process since it directly carbonizes tungsten in gas phase by vaporizing or sublimating the tungsten precursor.

Further, the present invention provides WC powder of grade of several ten nm by carbonization and condensation of molecular-level gas in vacuum by means of vapor reaction, and the nanophase powder produced thereby has high-strength and excellent wear-resistance, which can be suitably used as cemented carbide such as for carbide tools, or as materials for wear-resistance components or metal molds.

What is claimed is:

1. A method of producing nanophase WC powder by vapor phase reaction, which comprises the steps of preparing a precursor including tungsten; producing gas by vaporizing or sublimating said precursor; carbonizing said gas in the atmosphere without oxygen while maintaining pressure below atmospheric pressure; and condensing said carbonized gas.

2. The method of producing nanophase WC powder by vapor phase reaction according to claim 1, wherein said precursor, at least one, is selected from the group consisting of tungsten ethoxide, tungsten chloride, and tungsten hexacarbonyl.

3. The method of producing nanophase WC powder by vapor phase reaction according to claim 2, wherein said atmosphere without oxygen comprises at least one of CO, $CO_2$, $CH_4$, $C_2H_4$, He, Ar, $N_2$, or $H_2$.

4. The method of producing nanophase WC powder by vapor phase reaction according to the claim 3, wherein said step of carbonization is carried out at the temperature of 500~1,500° C.

5. The method of producing nanophase WC powder by vapor phase reaction according to the claim 4, wherein said carbonized gas is condensed under the pressure below atmospheric pressure.

6. The method of producing nanophase WC powder by vapor phase reaction according to the claim 5, wherein said carbonized gas is condensed by absorbing the same onto the surface of a cooler at the temperature below zero.

7. The method according to claim 1 of producing nanophase WC powder by vapor phase reaction according to claim 1 comprises at least one of CO, $CO_2$, $CH_4$, $C_2H_4$, He, Ar, $N_2$, or $H_2$.

8. The method of producing nanophase WC powder by vapor phase reaction according to the claim 1, wherein said step of carbonization is carried out at the temperature of 500~1,500° C.

9. The method of producing nanophase WC powder by vapor phase reaction according to the claim 1, wherein said carbonized gas is condensed under the pressure below atmospheric pressure.

10. The method of producing nanophase WC powder by vapor phase reaction according to the claim 1, wherein said carbonized gas is condensed by absorbing the same onto the surface of a cooler at the temperature below zero.

* * * * *